United States Patent
Zhao et al.

(10) Patent No.: US 12,532,154 B2
(45) Date of Patent: Jan. 20, 2026

(54) METHOD AND APPARATUS FOR ASSOCIATION BETWEEN COMMUNICATION DEVICES

(71) Applicant: HUAWEI TECHNOLOGIES CO., LTD., Guangdong (CN)

(72) Inventors: Mingyu Zhao, Shanghai (CN); Xueqiang Yan, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 427 days.

(21) Appl. No.: 18/182,946

(22) Filed: Mar. 13, 2023

(65) Prior Publication Data

US 2023/0217237 A1 Jul. 6, 2023

Related U.S. Application Data

(63) Continuation of application No. PCT/CN2021/112808, filed on Aug. 16, 2021.

(30) Foreign Application Priority Data

Sep. 14, 2020 (CN) .......................... 202010960238.4

(51) Int. Cl.
*H04W 8/20* (2009.01)
*H04L 67/303* (2022.01)
*H04W 8/18* (2009.01)
*H04W 8/22* (2009.01)

(52) U.S. Cl.
CPC ............. *H04W 8/18* (2013.01); *H04L 67/303* (2013.01); *H04W 8/22* (2013.01)

(58) Field of Classification Search
CPC ........... H04W 8/18; H04W 8/22; H04W 8/14; H04W 8/26; H04W 12/40; H04W 8/183; H04W 8/205; H04L 67/303; H04L 67/10
See application file for complete search history.

(56) References Cited

U.S. PATENT DOCUMENTS

| | | | |
|---|---|---|---|
| 2019/0058988 A1* | 2/2019 | Mathison | H04B 1/3816 |
| 2023/0056070 A1* | 2/2023 | Zhao | H04L 65/1069 |
| 2023/0208656 A1* | 6/2023 | Zhao | H04L 9/0825 |
| | | | 713/169 |
| 2023/0224793 A1* | 7/2023 | Zhao | H04W 40/00 |
| | | | 370/328 |

* cited by examiner

*Primary Examiner* — Joseph E Dean, Jr.
(74) *Attorney, Agent, or Firm* — Fish & Richardson P.C.

(57) ABSTRACT

This disclosure provides methods and apparatuses for association between communication devices. One method includes: sending, by a terminal device to a network device, a first message for establishment of an association relationship between the terminal device and a digital reflection (DR), wherein the first message comprises a first twin-globally unique temporary identity (TWIN-GUTI) of the terminal device, and wherein the first TWIN-GUTI comprises a first temporary identity (DRTI) of the DR and a globally unique identity (GUMEI) of first multi-access edge computing (MEC), and receiving, by the terminal device from the DR, a response message.

15 Claims, 4 Drawing Sheets

METHOD AND APPARATUS FOR ASSOCIATION BETWEEN COMMUNICATION DEVICES

CROSS-REFERENCE TO RELATED APPLICATIONS

This application is a continuation of International Application No. PCT/CN2021/112808, filed on Aug. 16, 2021, which claims priority to Chinese Patent Application No. 202010960238.4, filed on Sep. 14, 2020. The disclosures of the aforementioned applications are hereby incorporated by reference in their entireties.

TECHNICAL FIELD

This application relates to the communication field, and more specifically, to a method and an apparatus for association between communication devices.

BACKGROUND

An existing communication network is network-centric. A user adapts to a network. To be specific, the user may select only a function provided by the network. Particularly, a function provided by a centralized core network is of a large granularity, which cannot meet a personalized requirement of the user. Existing network element entities of the centralized core network are generally capable of processing a large quantity of subscribers, are deployed in a centralized manner, have a high position in a network, and have a risk of a single point of failure, for example, network elements such as mobility management, session management, subscriber data management, and policy management.

At present, a network architecture of a user centric network (user centric network, UCN) is proposed. A digital reflection (digital reflection, DR) is deployed on an edge cloud. Each UE has its own DR. The DR may be dynamically migrated with a subscriber to multi-access edge computing (Multi-access Edge Computing, MEC) in which the subscriber is located as required, to implement an architecture design for the user centric network.

The network architecture of the UCN is a revolutionary design for an existing network architecture. Therefore, a plurality of existing network functions, communication solutions, and work procedures need to be changed accordingly. After the subscriber is registered with the network, to clearly identify the subscriber and protect subscriber privacy, a globally unique temporary identity (globally unique temporary identity, GUTI) in an area in which the subscriber is located is assigned to the subscriber. This is a standard practice of the 3rd generation partnership project (3rd generation partnership project, 3GPP). However, in the network architecture of the UCN, each UE has the digital reflection DR in the network. In addition to identifying the subscriber and protecting privacy, the subscriber identity is also required to represent an association relationship between the UE and the DR.

SUMMARY

This application provides a method and an apparatus for association between communication devices, to improve user experience.

According to a first aspect, a method for association between communication devices is provided, including: A terminal device sends a first message to a network device, where the first message is used for establishment of an association relationship between the terminal device and a digital reflection DR; the first message includes a first twin-globally unique temporary identity TWIN-GUTI of the terminal device; and the first TWIN-GUTI includes a first temporary identity DRTI of the DR and a globally unique identity GUMEI of first multi-access edge computing MEC. The terminal device receives a response message sent by the DR.

Based on the foregoing technical solution, a design for the twin-globally unique temporary identity TWIN-GUTI of the terminal device in a network architecture of a UCN is implemented. The association relationship between the terminal device and the DR may be quickly established based on the temporary identity of the terminal device included in the TWIN-GUTI and temporary identity information of a DR corresponding to the terminal device. In a re-authentication process for a subscriber and a DR, a delay caused by re-authentication for a DR corresponding to the subscriber is avoided, and user experience may be improved.

In an implementation, the first TWIN-GUTI further includes a first temporary mobile identity TMSI of the terminal device, where the first TMSI is a TMSI within a range of the first MEC.

In an implementation, before the terminal device sends the first message to the network device, the method further includes: The terminal device stores the first TWIN-GUTI in a universal subscriber identity module USIM card.

In an implementation, the first TWIN-GUTI is generated by the first MEC.

In an implementation, the method further includes: The terminal device receives a second message, where the second message includes a second twin-globally unique temporary identity TWIN-GUTI generated by second multi-access edge computing MEC. The second TWIN-GUTI includes a second temporary identity DRTI of the DR, a second globally unique identity GUMEI of the second MEC, and a second temporary mobile identity TMSI of the terminal device. The second MEC is MEC to which the terminal device is handed over from the first MEC.

According to a second aspect, a method for association between communication devices is provided, including: A network device receives a first message sent by a terminal device, where the first message is used for establishment of an association relationship between the terminal device and a digital reflection DR; the first message includes a first twin-globally unique temporary identity TWIN-GUTI of the terminal device; and the first TWIN-GUTI includes a first temporary identity DRTI of the DR and a globally unique identity GUMEI of first multi-access edge computing MEC. The network device sends a third message to the DR, where the third message includes the first TWIN-GUTI.

In an implementation, the first TWIN-GUTI further includes a first temporary mobile identity TMSI of the terminal device, where the first TMSI is a TMSI within a range of the first MEC.

According to a third aspect, a method for association between communication devices is provided, including: A digital reflection DR receives a third message sent by a network device, where the third message is used for establishment of an association relationship between the DR and a terminal device; the third message includes a first twin-globally unique temporary identity TWIN-GUTI of the terminal device; and the first TWIN-GUTI includes a first temporary mobile identity TMSI of the terminal device and a globally unique identity GUMEI of first multi-access edge computing MEC. The DR sends a response message to the terminal device based on the first TMSI.

In an implementation, the first TWIN-GUTI further includes a temporary identity DRTI of the DR.

In an implementation, before the digital reflection DR receives the third message sent by the network device, the method further includes: The DR stores the first TWIN-GUTI.

According to a fourth aspect, a communication apparatus is provided, applied to a terminal device and including: a transceiver unit, configured to send a first message to a network device, where the first message is used for establishment of an association relationship between the terminal device and a digital reflection DR; the first message includes a first twin-globally unique temporary identity TWIN-GUTI of the terminal device; and the first TWIN-GUTI includes a first temporary identity DRTI of the DR and a globally unique identity GUMEI of first multi-access edge computing MEC. The transceiver unit is further configured to receive a response message sent by the DR.

In an implementation, the first TWIN-GUTI further includes a first temporary mobile identity TMSI of the terminal device, where the first TMSI is a TMSI within a range of the first MEC.

In an implementation, the apparatus further includes: a processing unit, configured to store the first TWIN-GUTI in a universal subscriber identity module USIM card.

In an implementation, the first TWIN-GUTI is generated by the first MEC.

In an implementation, the transceiver unit is further configured to receive a second message, where the second message includes a second twin-globally unique temporary identity TWIN-GUTI generated by second multi-access edge computing MEC. The second TWIN-GUTI includes a second temporary identity DRTI of the DR, a second globally unique identity GUMEI of the second MEC, and a second temporary mobile identity TMSI of the terminal device. The second MEC is MEC to which the terminal device is handed over from the first MEC.

According to a fifth aspect, a communication apparatus is provided, applied to a digital reflection DR and including: a transceiver unit, configured to receive a third message sent by a network device, where the third message is used for establishment of an association relationship between the DR and a terminal device; the third message includes a first twin-globally unique temporary identity TWIN-GUTI of the terminal device; and the first TWIN-GUTI includes a first temporary mobile identity TMSI of the terminal device and a globally unique identity GUMEI of first multi-access edge computing MEC. The transceiver unit is further configured to send a response message to the terminal device based on the first TMSI.

In an implementation, the first TWIN-GUTI further includes a temporary identity DRTI of the DR.

In an implementation, the apparatus further includes a processing unit, configured to store the first TWIN-GUTI.

According to a sixth aspect, a communication apparatus is provided, including a processor and a transceiver. The transceiver is configured to receive computer code or instructions, and transmit the computer code or the instructions to the processor. The processor runs the computer code or the instructions, for example, as in the method according to the first aspect or any possible implementation of the first aspect.

According to a seventh aspect, a communication apparatus is provided, including a processor and a transceiver. The transceiver is configured to receive computer code or instructions, and transmit the computer code or the instructions to the processor. The processor runs the computer code or the instructions, for example, as in the method according to the second aspect or any possible implementation of the second aspect.

According to an eighth aspect, a communication system is provided, including: the digital reflection DR and the terminal device in the methods according to the first aspect and the second aspect.

According to a ninth aspect, a computer-readable storage medium is provided. The computer-readable storage medium stores a computer program. When the computer program runs on a computer, the computer is enabled to perform the method according to the first aspect or any possible implementation of the first aspect.

According to a tenth aspect, a computer-readable storage medium is provided. The computer-readable medium stores a computer program. When the computer program runs on a computer, the computer is enabled to perform the method according to the second aspect or any possible implementation of the second aspect.

DESCRIPTION OF EMBODIMENTS

The following describes technical solutions of this application with reference to the accompanying drawings.

Embodiments of this application may be applied to various communication systems, for example, a wireless local area network (wireless local area network, WLAN) system, a narrow band Internet of things (narrow band-Internet of things, NB-IoT) system, a global system for mobile communication (global system for mobile communication, GSM), an enhanced data rate for GSM evolution (enhanced data rate for GSM evolution, EDGE) system, a wideband code division multiple access (wideband code division multiple access, WCDMA) system, a code division multiple access 2000 (code division multiple access, CDMA2000) system, a time division-synchronous code division multiple access (time division-synchronization code division multiple access, TD-SCDMA) system, a long term evolution (long term evolution, LTE) system, satellite communication, and a fifth generation (5th generation, 5G) system, or a new communication system that will emerge in the future.

A terminal device in embodiments of this application may include various handsets, vehicle-mounted devices, wearable devices, or computing devices that have a wireless communication function, or other processing devices connected to a wireless modem. The terminal may be a mobile station (mobile station, MS), a subscriber unit (subscriber unit), user equipment (user equipment, UE), a cellular phone (cellular phone), a smartphone (smartphone), a wireless data card, a personal digital assistant (personal digital assistant, PDA) computer, a tablet computer, a wireless modem (modem), a handset (handset), a laptop computer (laptop computer), a machine type communication (machine type communication, MTC) terminal, or the like.

An existing communication network is network-centric. A user adapts to a network. To be specific, the user may select only a function provided by the network. Particularly, a function provided by a centralized core network is of a large granularity, which cannot meet a personalized requirement of the user. Existing network element entities of the centralized core network are generally capable of processing a large quantity of subscribers, are deployed in a centralized manner, have a high position in a network, and have a risk of a single point of failure, for example, network elements such as mobility management, session management, subscriber data management, and policy management.

Figure 1:
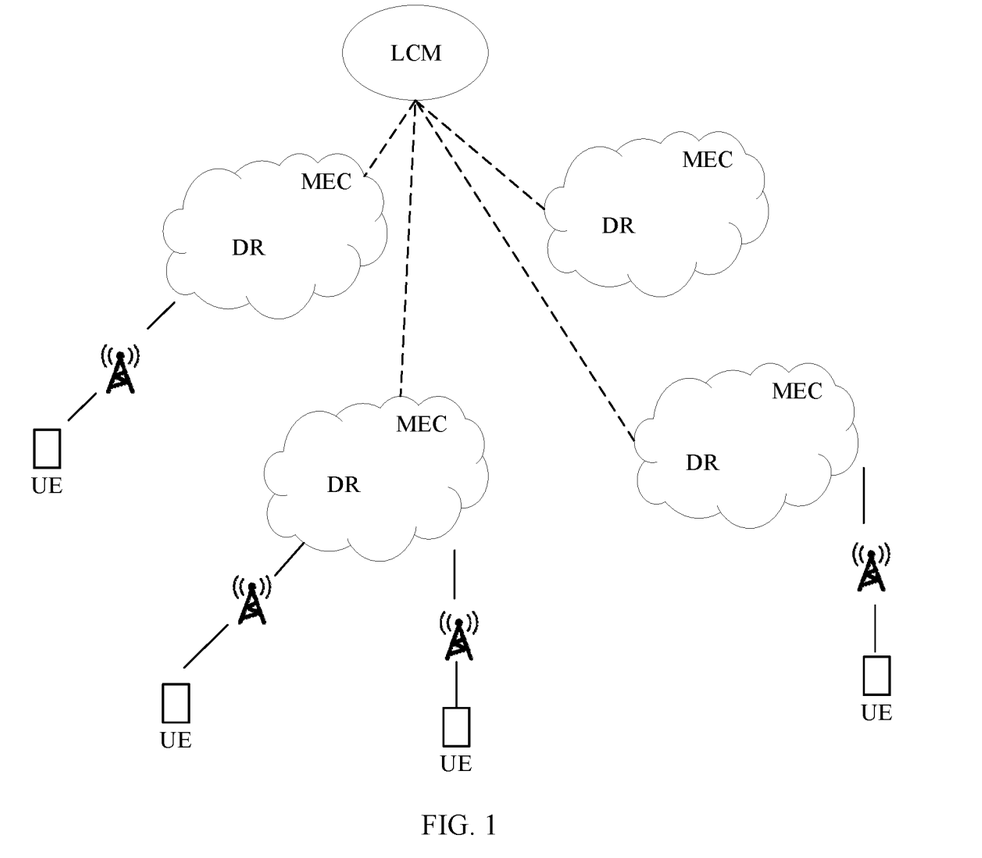
FIG. 1 is a schematic diagram of a UCN architecture.

To resolve the foregoing problems, a network architecture of a user centric network (user centric network, UCN) is proposed. As shown in FIG. 1, digital reflections (digital reflection, DR) are deployed on edge clouds. Each UE has its own DR. The DR may be dynamically migrated with a subscriber to multi-access edge computing (multi-access edge computing, MEC) where the subscriber is located as required, to implement an architecture design for the user centric network.

A distributed data provisioning system (distributed data provisioning system, DDPS) may manage personal digital property of a subscriber, including an identification identity, an application name identity, and subscriber status information. A distributed mapping system (distributed mapping system, DMS) is a distributed mapping system established for a subscriber identification identity, an application name, and an address based on technologies such as distributed hash, and is deployed in the edge cloud to meet near real-time update and query requirements. A life cycle management (life cycle management, LCM) system implements DR life cycle management and operations based on a distributed architecture.

The network architecture of the UCN is a revolutionary design for the existing network architecture. Therefore, many existing network functions, communication solutions, and work procedures need to be changed accordingly. After the subscriber is registered with the network, to clearly identify the subscriber and protect subscriber privacy, a globally unique temporary identity (globally unique temporary identity, GUTI) in an area in which the subscriber is located is assigned to the subscriber. This is a standard practice of the 3rd generation partnership project (3rd generation partnership project, 3GPP). However, in the network architecture of the UCN, each UE has a digital reflection DR in the network. In addition to identifying the subscriber and protecting privacy, the subscriber identity is also required to represent an association relationship between the UE and the DR. Therefore, embodiments of this application are mainly for a design of subscriber temporary identification codes of the UE and DR under the network architecture of the UCN.

Figure 2:
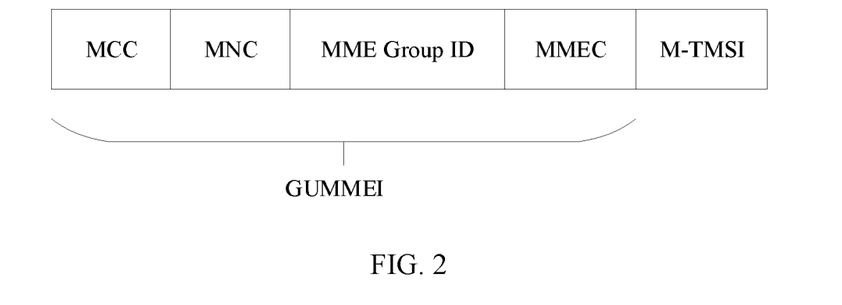
FIG. 2 is a schematic diagram of composition of a GUTI of UE in an LTE network.

In the LTE, the subscriber temporary identification code is an LTE globally unique dynamic temporary identity assigned by a mobility management entity (mobility management entity, MME) to UE. FIG. 2 is a schematic diagram of composition of a GUTI of UE in an LTE network. The GUTI includes two parts: a globally unique MME identifier (globally unique MME identifier, GUMMEI) and an MME-temporary mobile subscriber identity (MME-temporary mobile subscriber identity, M-TMSI). The GUMMEI indicates which MME assigns the GUTI, and the M-TMSI indicates a unique identity of UE in the MME.

The GUTI also includes a mobile country code (mobile country code, MCC), a mobile network code (mobile network code, MNC), and a group identity (group identity) of the MME. The mobile country code uniquely identifies three digits of a country to which a mobile subscriber belongs. The mobile network code is the code of an operator network in the country, and includes two to three digits to identify a mobile communication network to which the mobile subscriber belongs. An MME code (MME code, MMEC) uniquely identifies an MME in an MME group.

The GUTI is a permanent identity for identifying a subscriber without exposing the subscriber. In an LTE attach procedure, if the UE has a GUTI, the UE uses the GUTI. If the UE does not have a GUTI, the UE uses a temporary mobile subscriber identity (temporary mobile subscriber identity, IMSI) in plain text.

Figure 3:
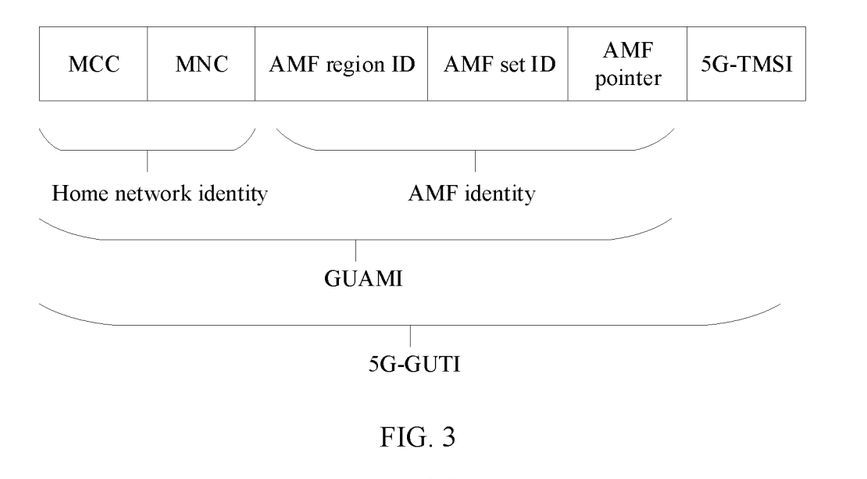
FIG. 3 is a schematic diagram of composition of a 5G-GUTI of UE in a 5G network.

In 5G, the subscriber temporary identification code is a 5G globally unique temporary identity assigned by an access and mobility management function (access and mobility management function, AMF) to UE, and is referred as a 5G-GUTI. FIG. 3 is a schematic diagram of composition of a 5G-GUTI of UE in a 5G network. The 5G-GUTI includes two parts: a globally unique AMF identity (globally unique AMF identity, GUAMI) and a 5G international mobile subscriber identity (5th generation international mobile subscriber identity, 5G-TMSI). The GUAMI is used to indicate which AMF assigns the 5G-GUTI. The 5G-TMSI is used to indicate a unique identity of UE in the AMF.

The 5G-GUTI further includes a mobile country code (mobile country code, MCC), a mobile network code (mobile network code, MNC), an AMF region identity (AMF region identity, AMF region ID), an AMF set identity (AMF set ID), and an AMF pointer (AMF pointer). The AMF pointer is used to point to an AMF in an AMF set.

The AMF may update a GUTI of a subscriber at any time and complete GUTI update in the next non-access stratum signaling exchange. In a 5G registration procedure, if the UE has a 5G-GUTI, the UE uses the 5G-GUTI. If the UE does not have a 5G-GUTI, the UE uses the IMSI.

In a centralized network element architecture, risks of a single point of failure and a distributed denial of service (distributed denial of service, DDOS) attack exist. For a distributed network architecture of the UCN, it is necessary to represent an association relationship between the UE and the DR of the UE. Neither the GUTI of the UE in LTE nor the 5G-GUTI of the UE in 5G is suitable.

Figure 4:
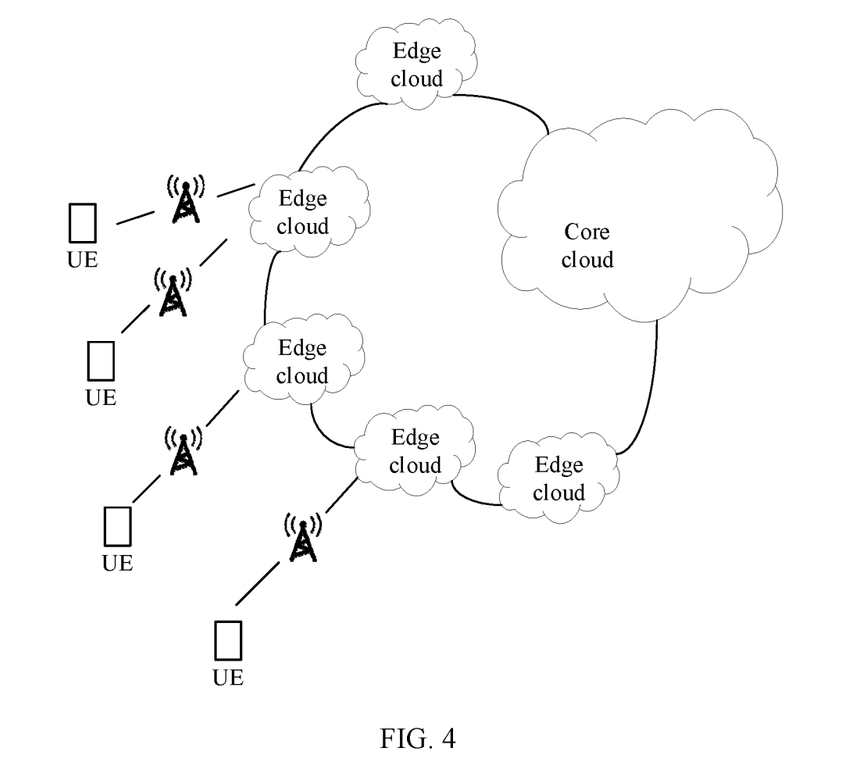
FIG. 4 is a schematic diagram of a network architecture in which edge clouds are widely deployed according to an embodiment of this application.

FIG. 4 is a schematic diagram of a network architecture in which edge clouds are widely deployed according to an embodiment of this application. In the future, network edge cloudification will become an inevitable trend. An edge cloud and a core cloud will collaborate and complement each other. The edge cloud is closer to a subscriber and may better support an application that has a strict standard on delay, data privacy and the like, and is suitable for distributed deployment of network functions. The embodiment of this application is based on an application scenario assuming that edge clouds have been widely deployed.

At present, in a scenario in which re-authentication is required if a terminal device that completes initial registration is powered off for a long time or is powered off for a long time and MEC moves, a DR corresponding to the terminal device needs to be first determined. For example, the DR corresponding to the terminal device needs to be obtained by querying a distributed database (distributed database, DDB). This process causes a delay in re-authentication for a subscriber, and affects user experience. It should be understood that after the terminal device completes the initial registration, an operator has assigned the corresponding DR to the terminal device.

Therefore, an embodiment of this application provides a method for association between communication devices. The method is used in a network architecture of a UCN, in a scenario in which re-authentication is required for a terminal device because the terminal device is powered off for a long time or is powered off for a long time and MEC moves, the terminal device may quickly perform association with a DR corresponding to the terminal device by using a globally unique temporary identifier of the terminal device.

Figure 5:
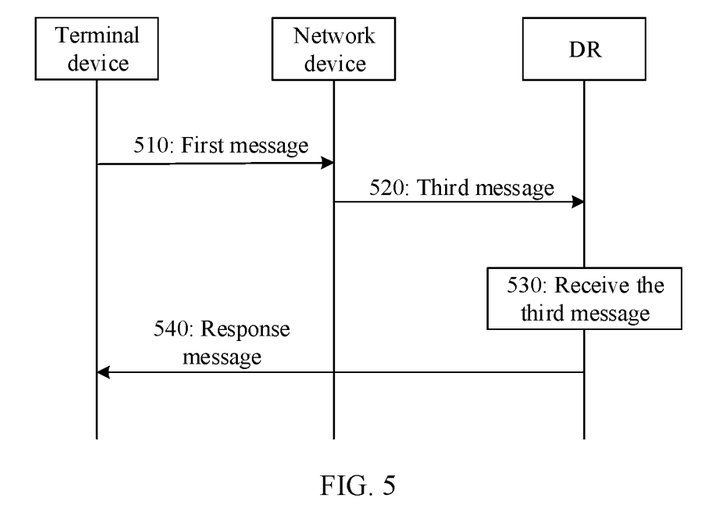
FIG. 5 is a process interaction diagram of a method for association between communication devices according to an embodiment of this application.

FIG. 5 is a process interaction diagram of a method for association between communication devices according to an embodiment of this application.

510: A terminal device sends a first message to a network device, where the first message is used for establishment of an association relationship between the terminal device and a digital reflection DR; the first message includes a first twin-globally unique temporary identity TWIN-GUTI (twin-globally unique temporary identity, TWIN-GUTI) of the terminal device; the first TWIN-GUTI includes a first temporary identity of the DR (DR temporary identity, DRTI) and a globally unique identity (globally unique MEC identity, GUMEI) of first multi-access edge computing MEC; the DR is a DR within a range of the first MEC; and the DRTI is a unique identity of the DR in the range of the first MEC. It should be understood that after the terminal device completes the initial registration, the operator has generated the twin-globally unique temporary identity for the terminal device. The network device may be a base station or another communication device. This is not limited in this embodiment of this application.

Optionally, the first TWIN-GUTI further includes a first temporary mobile identity TMSI of the terminal device. The first TMSI is a TMSI within the range of the first MEC, and the first TMSI is a unique identity of the terminal device in the range of the first MEC.

Optionally, the first TWIN-GUTI is generated by the first MEC. After the terminal device successfully registers for the first time, if UE is in a visited location, the DR will be migrated to the first MEC in which the terminal device is located. The first MEC in which the terminal device is located generates the first TWIN-GUTI for the terminal device, and stores the first TWIN-GUTI in a universal subscriber identity module (universal subscriber identity module, USIM) card. Optionally, the first TWIN-GUTI may also be stored in the DR. The first MEC generates the first DRTI for the DR, and the first MEC generates the first TMSI for the terminal device. In a subsequent registration request, the terminal device may identify the terminal device by using the first TWIN-GUTI. The first TWIN-GUTI may uniquely identify the first MEC, and the first TWIN-GUTI may be used to search for the first MEC that assigns the TWIN-GUTI. In addition, the first TWIN-GUTI may uniquely identify a DR corresponding to the terminal device, so that the terminal device can quickly find the DR corresponding to the terminal device.

Figure 6:
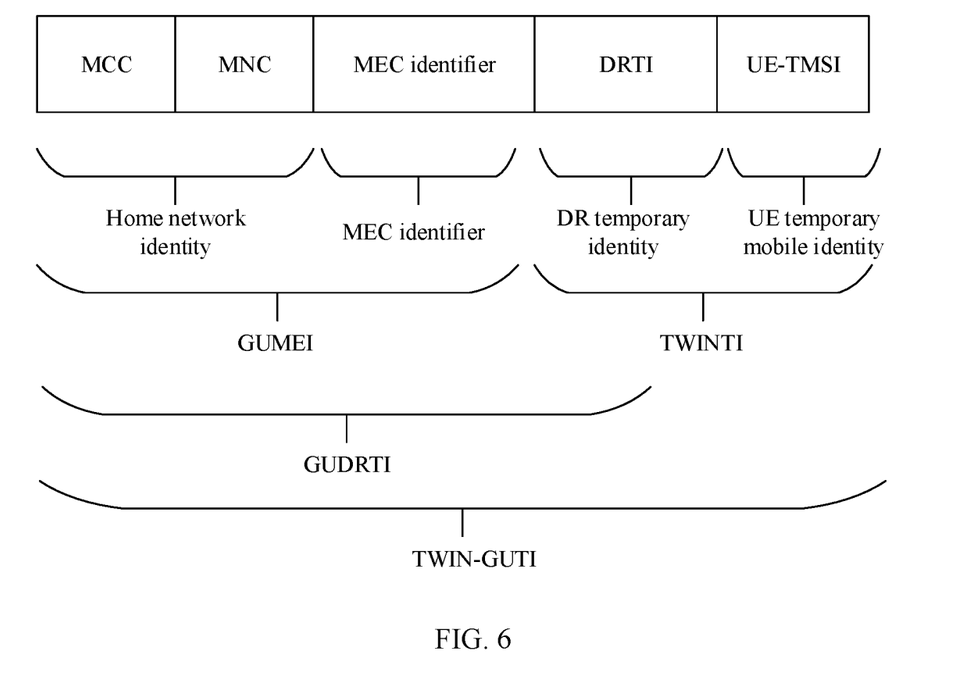
FIG. 6 is a schematic diagram of composition of a TWIN-GUTI according to an embodiment of this application.

FIG. 6 is a schematic diagram of composition of a TWIN-GUTI according to an embodiment of this application. A TWIN-GUTI also includes an MCC, an MNC, and an MEC identifier (MEC identifier). The MCC, MNC, and MEC identifier constitute a globally unique MEC identity GUMEI. The MCC, MNC, and DRTI constitute a globally unique DR temporary identity (globally unique DR temporary identity, GUDRTI). The DRTI and a UE-TMSI form a twin temporary identity (twin temporary identity, TWINTI). The DRTI and the UE-TMSI are in pairs and in a one-to-one correspondence. Specifically, the GUMEI may be used to indicate which MEC assigns the TWIN-GUTI.

520: The network device receives the first message sent by the terminal device, and sends a third message to the DR based on the first DR temporary identity included in the first message, where the third message is used for the establishment of an association relationship between the DR and the terminal device; the third message includes the first twin-globally unique temporary identity TWIN-GUTI of the terminal device; and the first TWIN-GUTI includes the first TMSI of the terminal device and the GUMEI of the first MEC. The GUMEI is used to find the first MEC in which the terminal device is located.

Optionally, the first TWIN-GUTI further includes a temporary identity DRTI of the DR.

Optionally, before the DR receives the third message sent by the network device, the DR stores the first TWIN-GUTI.

530: The DR receives the third message sent by the network device. The DR determines, based on the first TMSI of the terminal device included in the third message and a TMSI that is in a TWIN-GUTI of a terminal device associated with the DR and that is stored by the DR, that the terminal device is the terminal device associated with the DR.

540: The DR sends a response message to the terminal device based on the first TMSI. Optionally, the response message may be an authentication request message. For example, the authentication request message may include a random number that is generated by the DR and that is encrypted by using a public key of the terminal device. If the terminal device may perform decryption by using a private key of the terminal device to obtain the random number, the DR and the terminal device succeed in the authentication. The response message may alternatively be another message. This is not limited in this embodiment of this application.

The terminal device is movable. If the terminal device is handed over from the first MEC to second multi-access edge computing MEC, the DR associated with the terminal device will also be migrated from the first MEC to the second MEC. The second MEC may generate a second twin-globally unique temporary identity TWIN-GUTI for the terminal device. The second TWIN-GUTI includes a second temporary identity DRTI of the DR, a second globally unique identity GUMEI of the second MEC, and a second temporary mobile identifier TMSI of the terminal device.

Optionally, the second MEC may send a second message to the terminal device, where the second message includes a second TWIN-GUTI generated by the second MEC. The terminal device may receive the second message, and the terminal device stores the second TWIN-GUTI included in the second message. The second TWIN-GUTI may be used for subsequent authentication for the DR associated with the terminal device.

In the technical solution provided in this embodiment of this application, a design for the twin-globally unique temporary identity TWIN-GUTI of the terminal device in a network architecture of a UCN is implemented. The association relationship between the terminal device and the DR may be quickly established based on the temporary identity of the terminal device included in the TWIN-GUTI and temporary identity information of a DR corresponding to the terminal device. In a re-authentication process of a subscriber and a DR, a delay caused by re-authentication of a DR corresponding to the subscriber is avoided, and user experience may be improved.

Figure 7:
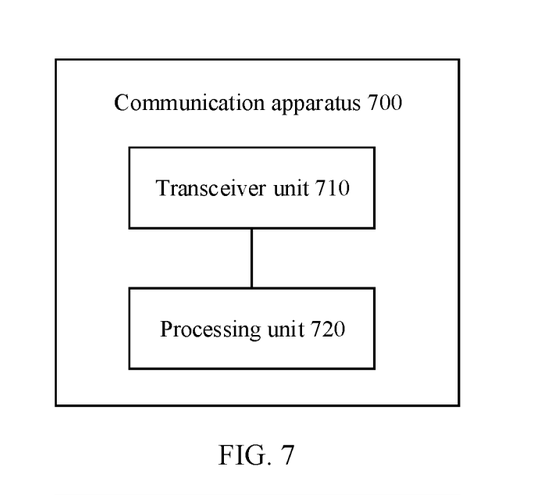
FIG. 7 is a schematic block diagram of a communication apparatus according to an embodiment of this application.

FIG. 7 is a schematic block diagram of a communication apparatus 700 according to an embodiment of this application. The communication apparatus may be applied to the terminal device in the method embodiment in FIG. 5, or may be a component that implements the method according to the embodiment in FIG. 5, for example, a chip. A communication apparatus 700 includes a transceiver unit 710 and a processing unit 720.

The transceiver unit 710 is configured to send a first message to a network device. The first message is used for establishment of an association relationship between the terminal device and a digital reflection DR. The first message includes a first twin-globally unique temporary identity TWIN-GUTI of the terminal device. The first TWIN-GUTI includes a first temporary identity DRTI of the DR and a globally unique identity GUMEI of first multi-access edge computing MEC. The transceiver unit 710 is further configured to receive a response message sent by the DR.

Optionally, the first TWIN-GUTI further includes a first temporary mobile identity TMSI of the terminal device, where the first TMSI is a TMSI within a range of the first MEC.

Optionally, the processing unit 720 is configured to store the first TWIN-GUTI in a universal subscriber identity module USIM card.

Optionally, the first TWIN-GUTI is generated by the first MEC.

Optionally, the transceiver unit 710 is further configured to receive a second message, where the second message includes a second twin-globally unique temporary identity TWIN-GUTI generated by second multi-access edge computing MEC. The second TWIN-GUTI includes a second temporary identity DRTI of the DR, a second globally unique identity GUMEI of the second MEC, and a second temporary mobile identity TMSI of the terminal device. The second MEC is an MEC to which the terminal device is handed over from the first MEC.

Figure 8:
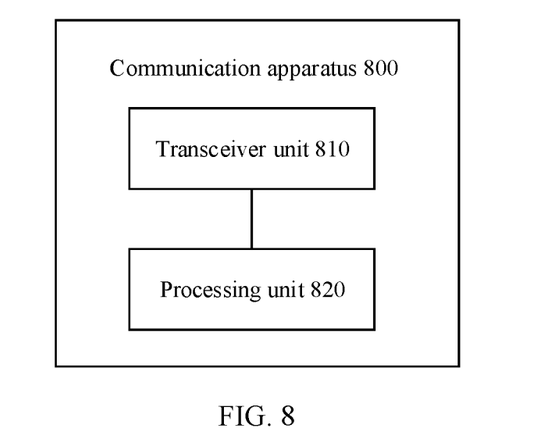
FIG. 8 is a schematic block diagram of another communication apparatus according to an embodiment of this application.

FIG. 8 is a schematic block diagram of another communication apparatus 800 according to an embodiment of this application. The communication apparatus may be applied to the DR in the method embodiment in FIG. 5, or may be a component that implements the method according to the embodiment in FIG. 5, for example, a chip. A communication apparatus 800 includes a transceiver unit 810 and a processing unit 820.

The transceiver unit 810 is configured to receive a third message sent by a network device, where the third message is used for establishment of an association relationship between the DR and a terminal device; the third message includes a first twin-globally unique temporary identity TWIN-GUTI of the terminal device; and the first TWIN-GUTI includes a first temporary mobile identity TMSI of the terminal device and a globally unique identity GUMEI of first multi-access edge computing MEC. The transceiver unit 810 is further configured to send a response message to the terminal device based on the first TMSI.

Optionally, the first TWIN-GUTI further includes a temporary identity DRTI of the DR.

Optionally, the processing unit 820 is configured to store the first TWIN-GUTI.

Figure 9:
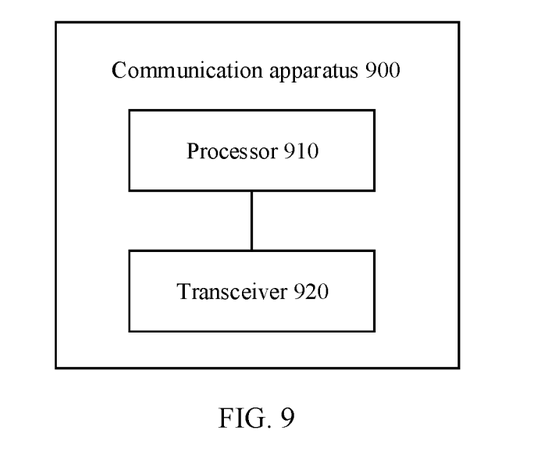
FIG. 9 is a schematic block diagram of another communication apparatus according to an embodiment of this application.

FIG. 9 is a schematic block diagram of another communication apparatus 900 according to an embodiment of this application. The communication apparatus includes a processor 910 and a transceiver 920. The transceiver 920 is configured to receive computer code or instructions, and transmit the computer code or the instructions to the processor 910. The processor 910 runs the computer code or the instructions to implement the method according to the embodiment of this application.

An embodiment of this application provides a communication device, including a memory and a processor. The memory is configured to store a computer program, and the processor is configured to execute the computer program stored in the memory, so that the communication device performs the method according to the embodiments of this application. Optionally, the communication device may be the terminal device or the digital reflection DR in this embodiment of this application.

The foregoing processor may be an integrated circuit chip, and has a signal processing capability. In an implementation process, steps in the foregoing method embodiments are implemented by using a hardware integrated logic circuit in the processor, or by using instructions in a form of software. The foregoing processor may be a general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or transistor logic device, or a discrete hardware component, and may implement or perform the methods, steps, and logical block diagrams that are disclosed in embodiments of this application. The general-purpose processor may be a microprocessor, or the processor may be any conventional processor or the like. Steps of the methods disclosed with reference to the embodiments of this application may be directly performed and completed by a hardware decoding processor, or may be performed and completed by using a combination of hardware and software modules in the decoding processor. The software module may be located in a storage medium mature in the art, such as a random access memory, a flash memory, a read-only memory, a programmable read-only memory or an electrically erasable programmable memory, or a register. The storage medium is located in the memory, and the processor reads information in the memory and completes the steps of the foregoing methods in combination with hardware of the processor.

The foregoing memory may be a volatile memory or a non-volatile memory, or may include both a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) and is used as an external cache. By way of example and not limitative description, RAMs in many forms may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be understood that the foregoing memory may be integrated into the processor, or the foregoing processor and the memory may be integrated into a same chip, or be separately located on different chips and connected in an interface coupling manner. This is not limited in this embodiment of this application. An embodiment of this application provides a communication chip, including a processor and a communication interface. The processor is configured to read instructions to perform the methods in the embodiments of this application.

An embodiment of this application further provides a computer-readable storage medium. The computer-readable storage medium stores a computer program used to implement the methods according to the foregoing method embodiments. When the computer program runs on a computer, the computer is enabled to implement the methods according to the foregoing method embodiments.

A person of ordinary skill in the art may be aware that units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each specific application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described again herein.

In several embodiments provided in this application, it should be understood that the disclosed system, apparatus, and method may be implemented in another manner. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes a medium that may store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for association between communication devices, comprising:
    sending, by a terminal device to a network device, a first message for establishment of an association relationship between the terminal device and a digital reflection (DR), wherein the first message comprises a first twin-globally unique temporary identity (TWIN-GUTI) of the terminal device, and wherein the first TWIN-GUTI comprises a first temporary identity (DRTI) of the DR and a globally unique identity (GUMEI) of first multi-access edge computing (MEC); and
    receiving, by the terminal device from the DR, a response message.

2. The method according to claim 1, wherein the first TWIN-GUTI further comprises a first temporary mobile identity (TMSI) of the terminal device, and wherein the first TMSI is within a range of the first MEC.

3. The method according to claim 1, wherein before the sending, by a terminal device, a first message to a network device, the method further comprises:
    storing, by the terminal device, the first TWIN-GUTI in a universal subscriber identity module (USIM) card.

4. The method according to claim 1, wherein the first TWIN-GUTI is generated by the first MEC.

5. The method according to claim 1, wherein the method further comprises:
    receiving, by the terminal device, a second message, wherein the second message comprises a second TWIN-GUTI generated by second MEC, wherein the second TWIN-GUTI comprises a second DRTI of the DR, a second GUMEI of the second MEC, and a second TMSI of the terminal device, and wherein the second MEC is a MEC to which the terminal device is handed over from the first MEC.

6. A communication apparatus implemented in a terminal device, comprising:

at least one processor;

a transceiver coupled to the at least one processor; and one or more memories coupled to the at least one processor and storing programming instructions for execution by the at least one processor to:

send, via the transceiver to a network device, a first message for establishment of an association relationship between the terminal device and a digital reflection (DR), wherein the first message comprises a first twin-globally unique temporary identity (TWIN-GUTI) of the terminal device, and wherein the first TWIN-GUTI comprises a first temporary identity (DRTI) of the DR and a globally unique identity (GUMEI) of first multi-access edge computing (MEC); and receive, via the transceiver a response message from the DR.

7. The apparatus according to claim 6, wherein the first TWIN-GUTI further comprises a first temporary mobile identity (TMSI) of the terminal device, and wherein the first TMSI is within a range of the first MEC.

8. The apparatus according to claim 6, wherein the programming instructions are for execution by the at least one processor to:

store the first TWIN-GUTI in a universal subscriber identity module (USIM) card.

9. The apparatus according to claim 6, wherein the first TWIN-GUTI is generated by the first MEC.

10. The apparatus according to claim 6, wherein the programming instructions are for execution by the at least one processor to:

receive a second message, wherein the second message comprises a second TWIN-GUTI generated by second MEC, wherein the second TWIN-GUTI comprises a second DRTI of the DR, a second GUMEI of the second MEC, and a second TMSI of the terminal device, and wherein the second MEC is a MEC to which the terminal device is handed over from the first MEC.

11. A non-transitory computer-readable storage medium storing one or more instructions executable by at least one processor to perform operations comprising:

sending, to a network device, a first message for establishment of an association relationship between a terminal device and a digital reflection (DR), wherein the first message comprises a first twin-globally unique temporary identity (TWIN-GUTI) of the terminal device, and wherein the first TWIN-GUTI comprises a first temporary identity (DRTI) of the DR and a globally unique identity (GUMEI) of first multi-access edge computing (MEC); and receiving, from the DR, a response message.

12. The non-transitory computer-readable storage medium according to claim 11, wherein the first TWIN-GUTI further comprises a first temporary mobile identity (TMSI) of the terminal device, and wherein the first TMSI is within a range of the first MEC.

13. The non-transitory computer-readable storage medium according to claim 11, wherein before sending the first message, the operations further comprising:

storing the first TWIN-GUTI in a universal subscriber identity module (USIM) card.

14. The non-transitory computer-readable storage medium according to claim 11, wherein the first TWIN-GUTI is generated by the first MEC.

15. The non-transitory computer-readable storage medium according to claim 11, wherein the operations further comprising:

receiving a second message, wherein the second message comprises a second TWIN-GUTI generated by second MEC, wherein the second TWIN-GUTI comprises a second DRTI of the DR, a second GUMEI of the second MEC, and a second TMSI of the terminal device, and wherein the second MEC is a MEC to which the terminal device is handed over from the first MEC.

* * * * *